United States Patent

Aislabie et al.

[11] Patent Number: 5,983,649
[45] Date of Patent: Nov. 16, 1999

[54] SYSTEM AND METHOD FOR PREVENTION OF WINDSHIELD FOGGING IN A MOTOR VEHICLE

[75] Inventors: Martin J. Aislabie, Warks, United Kingdom; Mark David McBroom, Northville, Mich.; Karienne Ann Yockey, Ann Arbor, Mich.; Jeffrey S. Arsenault, Plymouth, Mich.; Chris G. Oehring, Monroe, Mich.

[73] Assignees: Ford Motor Company, Dearborn, Mich.; Jaguar Cars Limited, Coventry, United Kingdom

[21] Appl. No.: 09/079,463

[22] Filed: May 15, 1998

[51] Int. Cl.⁶ .................................................. B60H 3/00
[52] U.S. Cl. .............................. 62/133; 62/186; 62/244; 165/204; 454/121
[58] Field of Search ............................ 62/133, 180, 186, 62/158, 93, 94, 177, 178, 179, 244; 165/204, 42, 43; 454/75, 121

[56] References Cited

U.S. PATENT DOCUMENTS

| 5,033,672 | 7/1991 | sakamoto et al. | 62/133 X |
| 5,137,213 | 8/1992 | Yamamoto et al. | 237/2 A |
| 5,156,204 | 10/1992 | Doi | 165/43 X |
| 5,301,515 | 4/1994 | Iritani et al. | 62/180 X |
| 5,467,605 | 11/1995 | Hennessee et al. | 62/133 |
| 5,517,101 | 5/1996 | Sakai et al. | 165/42 X |
| 5,624,310 | 4/1997 | Fredriksson et al. | 454/121 |

FOREIGN PATENT DOCUMENTS 58-194615  11/1983  Japan.
61-139514  6/1986   Japan.

Primary Examiner—Harry B. Tanner
Attorney, Agent, or Firm—James J. Dottavio

[57] ABSTRACT

A method and system for controlling a heating, ventilation and air-conditioning (HVAC) system of a vehicle to prevent fogging of a windshield of the automotive vehicle is provided. The method and system include a determination of whether the vehicle has been recently turned "off", and upon determining the vehicle has been recently turned "off", commanding the HVAC system to a floor mode.

20 Claims, 3 Drawing Sheets

SYSTEM AND METHOD FOR PREVENTION OF WINDSHIELD FOGGING IN A MOTOR VEHICLE

FIELD OF THE INVENTION

The present invention is related to a system and method for defrosting a windshield in a motor vehicle after the ignition is switched off.

BACKGROUND OF THE INVENTION

Modern motor vehicles are equipped with a windshield defroster which is typically part of the climate control system of the automobile. As described in U.S. Pat. No. 5,624,310, to Fredriksson et al ('310 patent), which is incorporated herein by reference in its entirety, a problem which may occur in such an automobile when the vehicle is operated with the climate control system in an air conditioning or defrost mode, then the vehicle is shut off for a short period of time. When the vehicle is restarted, condensation within the evaporator may be blown onto the windshield and cause a fogging of the windshield. The '310 patent addresses this problem by disabling the climate control fan or blower for a period of time until the evaporator has reached an optimal low temperature.

Applicants believe this approach may lead to customer dissatisfaction because the occupants of the vehicle will detect that the blower motor is not operating and may perceive this to be a defective blower motor. Furthermore, the air conditioner compressor does not operate below a predetermined temperature and the selected mode may not have the climate control system operate in a mode in which the air conditioning system is activated, in which case the evaporator temperature will not reach the optimal temperature. In either case, the blower may not operate for an unsatisfactory time period.

It would therefore be desirable to provide a system and method for defrosting a windshield in a motor vehicle which does not disable the blower motor and which prevents fogging of the windshield.

SUMMARY OF THE INVENTION

It is thus a general object of the present invention to provide a system and method for defrosting a windshield in a motor vehicle which does not disable the blower motor and which prevents fogging of the windshield In carrying out the above object and other objects, features, and advantages of the present invention, a method and system are provided for controlling a heating, ventilation and air-conditioning (HVAC) system of a vehicle to prevent fogging of a windshield of the automotive vehicle. The method and system for controlling a heating, ventilation and air-conditioning (HVAC) system of a vehicle to prevent fogging of a windshield of the automotive vehicle include a determination of whether the vehicle has been recently turned "off", and upon determining the vehicle has been recently turned "off", commanding the HVAC system to a floor mode.

DETAILED DESCRIPTION OF PREFERRED EMBODIMENTS

Figure 1:
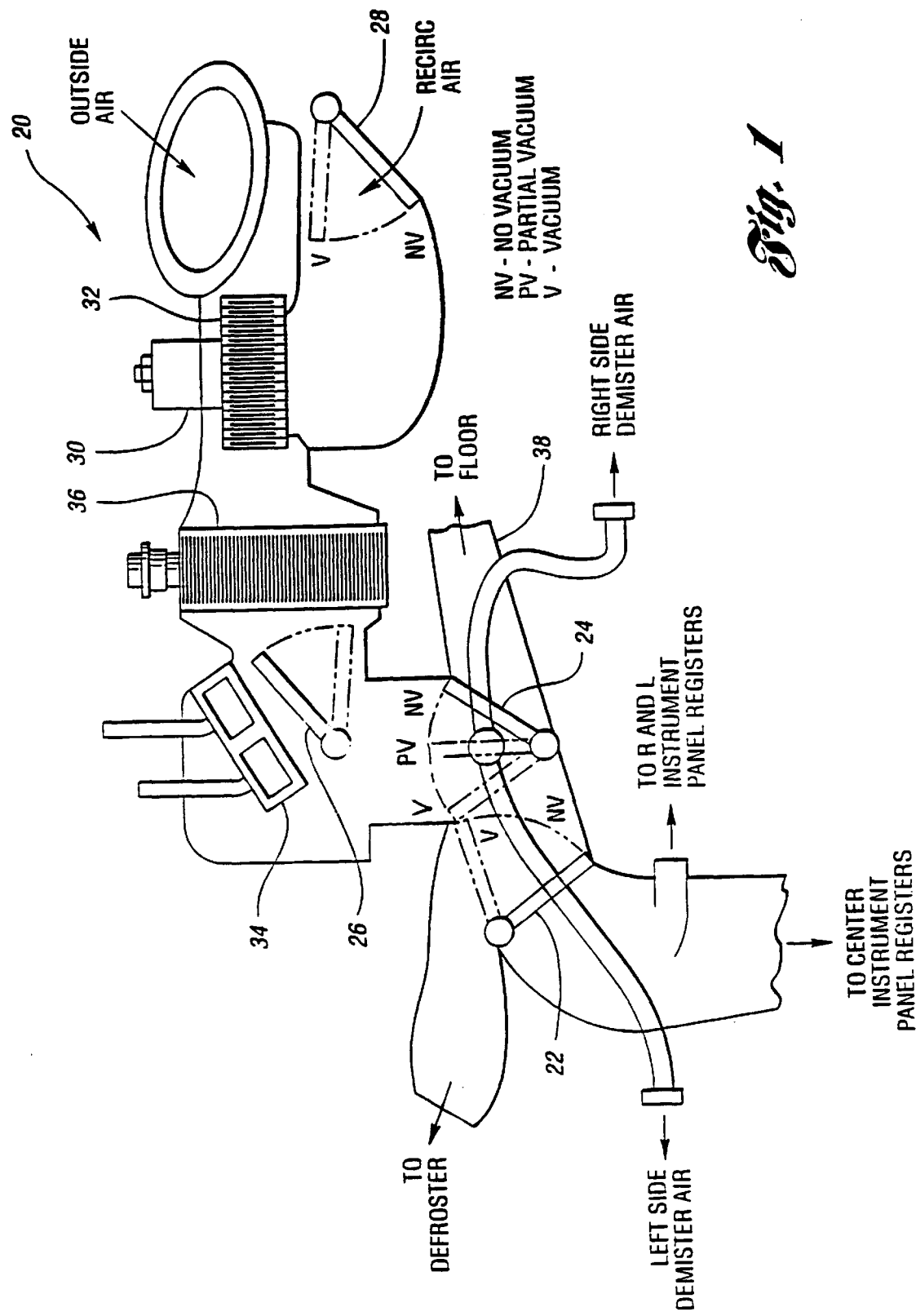
FIG. 1 is a schematic diagram illustrating an air handling system which can be controlled by the method and control system of the present invention.

In general, control of temperature and defrosting the windshield in an automobile is accomplished using various actuators to adjust the temperature and flow of air supplied to the cabin of the vehicle. FIG. 1 shows schematically an air handling system of an HVAC (heating, ventilation and air conditioning) system, indicated at 20. The system 20 includes the arrangement of air flow doors, including panel-defrost, floor-panel, and outside recirculated air actuators or doors 22, 24, and 28, respectively. The doors 22, 24 and 28 are typically driven by vacuum motors (not shown) between their various vacuum, partial vacuum and no vacuum positions in a conventional fashion as indicated in FIG. 1, or may be driven by an electric servo motor. A temperature control door 26 is also provided, and preferably driven by an electric servo motor (not shown) also in a conventional fashion.

The system 20 also includes a variable speed blower motor or fan 30 including a blower wheel 32. The system further includes heating and cooling elements such as a heater core 34 and an evaporator core 36 in a typical vehicle air conditioning plant Including a compressor 37. Each of the above components is in communication with ducting 38 in order to control temperature, the direction of air flow and the ratio of fresh air to recirculated air.

Figure 2:
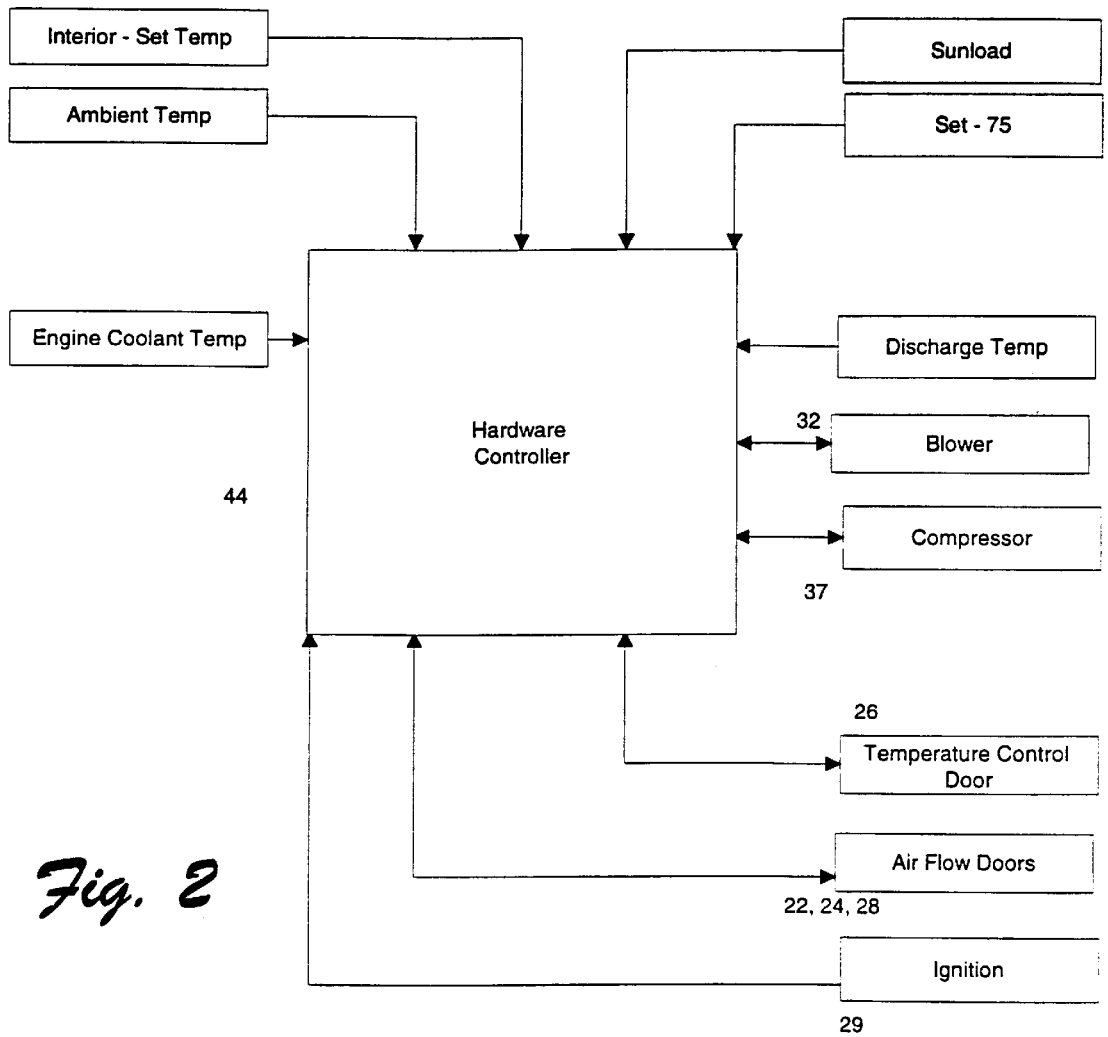
FIG. 2 is a schematic block diagram of the control system of the present invention.

For automatic control of the temperature and flow of air in the cabin, conditions within and outside the cabin are monitored by sensors and an electronic controller generates signals to control the plant actuators according to the conditions as indicated by the sensors. As illustrated in FIG. 2, a typical complement of sensors of the HVAC system provide signals which are representative of interior temperature, ambient (outside) air temperature, engine coolant temperature (ECT), discharge air temperature and sunload. In addition, there is a set signal or set temperature value indicating the desired temperature that is set manually by the driver.

The signals are provided to a hardware controller 44 as inputs. Hardware controller 44, in turn, controls the doors 22 through 28 to regulate the temperature and flow of air and ultimately to maintain the comfort of driver and passengers in the vehicle. The controller 44 also receives signals from the ignition switch 29 and the HVAC system 20 to indicate the operating of the switch 29 and system 20. The controller 44 preferably continually monitors the state of the ignition switch 29 and the state of the HVAC system 20.

Operation of the HVAC system is described in further detail in copending application Ser. No. 08/871,803, assigned to the assignee of the present invention, which is incorporated herein by reference in its entirety.

Figure 3:
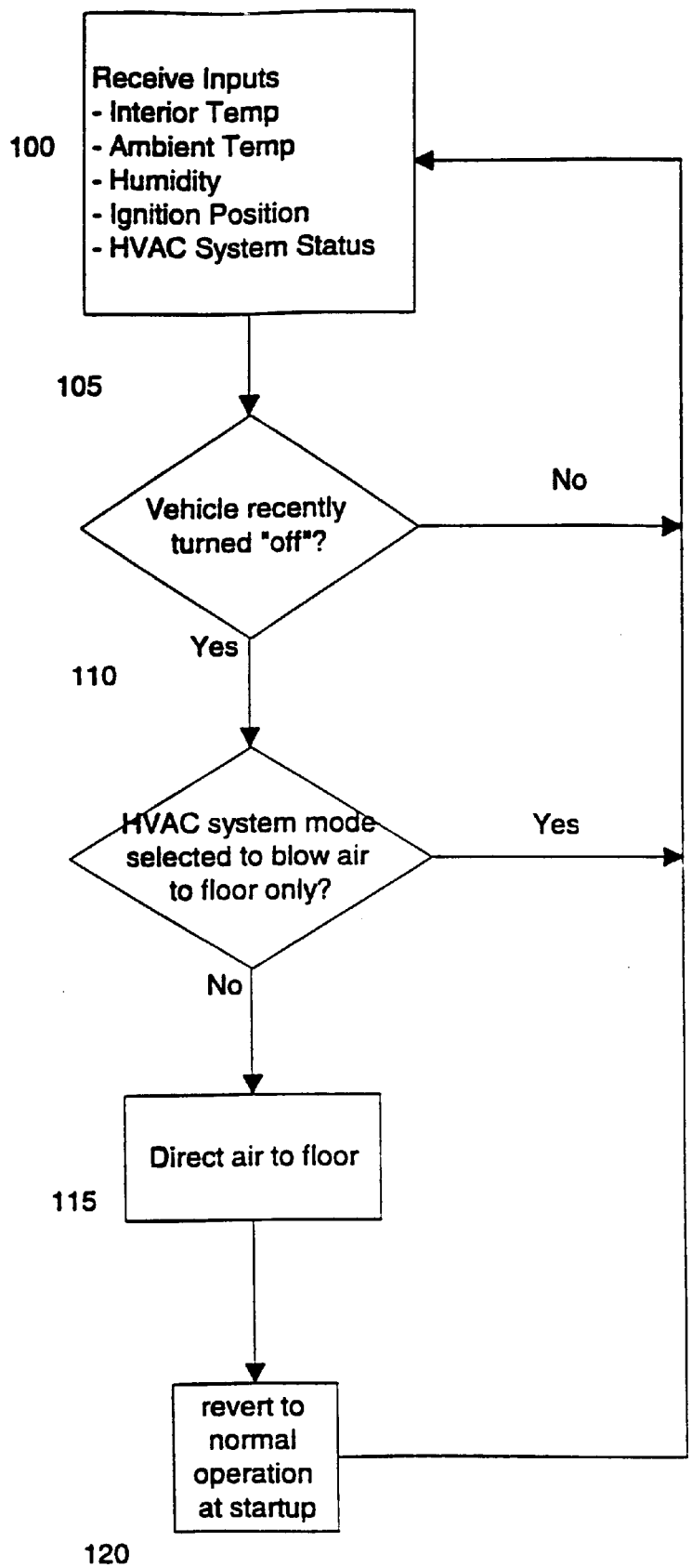
FIG. 3 is a flow diagram illustrating the general sequence of steps associated with the operation of the present invention.

Turning now to FIG. 3, there is shown a flow diagram illustrating the general sequence of steps associated with the method of the present invention. Although the steps shown in FIG. 3 are depicted sequentially, they can be implemented utilizing interrupt-driven programming strategies, object-oriented programming, or the like.

The method begins with the step of receiving a plurality of inputs, as shown at block 100, which may include, but are not limited to, interior temperature, ambient temperature, humidity, and ignition position, as sensed by respective sensors. Secondly, the controller 44 determines when the vehicle is turned "off" 105.

When the vehicle is turned "off", the controller 44 preferably directs all air away from the windshield, preferably by directing all air to the floor by moving all doors 22, 24 to direct all air to the floor and blocking air flow to the defroster and panel vents. In a preferred embodiment, the floor door is open 100%, the Panel is closed 100%, the Defrost door is closed 100%, the Cold Air Bypass door is closed 100% and the Recirculation Door is closed 100%.

In a preferred embodiment, the controller 44 receives a signal to determine if the electrical system is properly charged before moving any doors. If the voltage is outside a predetermined level, then the doors are left in the same position as when the ignition was turned "on". In a preferred embodiment, the voltage must be between approximately 9 V to 16 V. Preferably, the controller waits a predetermined time period before moving the doors as described above, in a preferred embodiment 120 seconds.

Further tests may be conducted by the controller 44 before moving the doors, including sensing ambient and vehicle temperatures to determine whether condensation is likely to occur. At low ambient temperatures, in a preferred embodiment, below 40 degrees Fahrenheit, the doors are not actuated after the vehicle is turned "off". In another embodiment, if the vehicle operating temperature is below a predetermined level, preferably approximately 30 degrees Fahrenheit, the doors are not moved further.

In a further preferred embodiment, the blower motor blows the air through the floor ducts for a predetermined interval when the interior vehicle temperature drops a predetermined amount, preferably ten degree increments.

In an alternative embodiment, the floor duct door remains open for a predetermined period after the vehicle is restarted and the blower blows air to the floor for a predetermined timer period as described in further detail in copending application Ser. No. 09/032,453, assigned to the assignee of this invention, which is incorporated herein by reference.

Once the vehicle is restarted, the doors are moved to the position preselected before the vehicle was turned "off". Alternatively, the air is directed to the floor until the controller selects the proper operating mode.

The present invention is preferably used with an Electronic Automatically Temperature Controlled (EATC) climate control system. However, it may be adapted to operate with a manual system, utilizing a controller to control the air flow away from the windshield under the conditions described above.

Although the preferred embodiments of the present invention have been described, it will be apparent to a person skilled in the art that variatione may be made to the system and method described herein without departing from the scope of the invention as defined by the following claims.

What is claimed is:

1. A method for controlling a heating, ventilation and air-conditioning (HVAC) system of a vehicle to prevent fogging of a windshield of the automotive vehicle, the method comprising:

determining whether the vehicle has been recently turned "off"; and upon determining the vehicle has been recently turned "off", commanding the HVAC system to direct air away from the windshield.

2. The method according to claim 1, further comprising the step of directing the air to the floor.

3. The method according to claim 2, further comprising the steps of:

measuring a voltage of a charging system of the vehicle;

determining whether the voltage is outside a predetermined range; and if the voltage is outside the predetermined range, not commanding the HVAC system to the floor mode.

4. The method according to claim 3, wherein the predetermined voltage range is approximately 7 V–16 V.

5. The method according to claim 2, wherein the controller waits a predetermined time after the vehicle is turned "off" before commanding the HVAC system to the floor mode.

6. The method according to claim 5, wherein the predetermined time period is approximately 120 seconds.

7. The method according to claim 6, further comprising the steps of:

measuring a voltage of a charging system of the vehicle;

determining whether the voltage is outside a predetermined range; and if the voltage is outside the predetermined range, not commanding the HVAC system to the floor mode.

8. The method as recited in claim 2 further comprising the steps of:

receiving a plurality of input signals;

determining whether the HVAC system is dry; and if the HVAC system is dry, not commanding the HVAC system to the floor mode.

9. The method according to claim 8, wherein the step of determining whether the HVAC system is dry comprises determining whether the ambient temperature is below a predetermined temperature and whether the vehicle temperature is above a predetermined temperature.

10. The method according to claim 8, wherein the step of determining whether the HVAC system is dry comprises determining whether a compressor was operating when the vehicle was turned "off" and determining whether a blower was operating for a second predetermined time period while the compressor was not operating prior to the vehicle being turned "off".

11. The method according to claim 10, wherein the third predetermined time period comprises approximately 120 minutes.

12. The method according to claim 10, wherein the step of determining whether the HVAC system is dry further comprises determining whether the ambient temperature is below a predetermined temperature.

13. A heating, ventilation and air-conditioning (HVAC) system of a vehicle to prevent fogging of a windshield of the automotive vehicle, the HVAC system comprising:

a blower motor for blowing a flow of air through the HVAC system;

means to control the flow of air;

means to determine whether the vehicle was recently turned "off"; and means for commanding the air flow control means to direct the flow of air away from the windshield after the vehicle is turned "off".

14. A system according to claim 13, the vehicle comprising a charging system with a voltage, the HVAC system further comprising means for detecting the voltage and for not commanding the air flow control means if the voltage is outside a predetermined range.

15. A charging system according to claim 13 further comprising a timer, wherein the means for commanding the air flow is disabled for a predetermined time.

16. A system according to claim 15, the vehicle comprising a charging system with a voltage, the HVAC system further comprising means for detecting the voltage and for not commanding the air flow control means if the voltage is outside a predetermined range.

17. A system according to claim 16 further comprising:
 a plurality of sensors for receiving a plurality of input signals;
 a controller for determining whether the HVAC system is dry and if the HVAC system is not dry commanding the HVAC system to the floor mode after the vehicle is turned "off".

18. A system according to claim 17, further comprising a pair of sensors to determine whether the ambient temperature is below a predetermined temperature and whether the vehicle temperature is above a predetermined temperature.

19. The system as provided in claim 17, wherein the controller determines whether the HVAC system is dry by determining whether a compressor was operating when the vehicle was turned "off" and determining whether a blower was operating for a second predetermined time period while the compressor was not operating prior to the vehicle being turned "off".

20. The system as provided in claim 19, wherein the controller further determines whether the HVAC system is dry by determining whether the ambient temperature is below a predetermined temperature.

\* \* \* \* \*